2,787,561
CROSS-LINKABLE ACRYLONITRILE INTERPOLYMERS AND COATING COMPOSITIONS DERIVED THEREFROM

Philip F. Sanders, Lima, Pa., assignor to E. I. du Pont de Nemours and Company, Wilmington, Del., a corporation of Delaware No Drawing. Application July 23, 1953, Serial No. 369,968

11 Claims. (Cl. 117—232)

This invention relates to cross-linkable acrylonitrile interpolymers, it particularly relates to coating compositions derived therefrom, more particularly to aqueous dispersions of such coating compositions and process of making same.

Many varieties of coating compositions have been used in the past based on various polymeric materials. The coatings are generally deposited from a solution of the film forming components in volatile organic solvents.

The solution type coatings have the disadvantage of the presence of volatile organic solvents, which are costly and sometimes noxious. Solvent recovery systems to salvage the volatile solvents offset the cost in part. Another disadvantage of the solution type of coating compositions is that the viscosity of the coating varies significantly with the amount of dissolved film former and its molecular weight. A still further disadvantage of the dry resinous coatings deposited from solutions is that they soften or redissolve when contacted with solvents for the resin. Application characteristics of polymer solutions necessitate applying numerous coats of the coating composition at relatively low solids.

The preferred aqueous dispersion coating compositions of this invention avoid the disadvantages of the solution type coating compositions by use of water as the predominating component of the volatile vehicle and permits use of higher molecular weight polymers than is possible with polymer solutions. The coating compositions of this invention also avoid some of the disadvantages of the prior art, with reference to solubility, by use of resinous interpolymers which cure to an insoluble state.

The primary object of this invention is to provide novel cross-linkable acrylonitrile interpolymers. A further object is the preparation of coating compositions based on the novel cross-linkable acrylonitrile interpolymers. A still further object is the preparation of aqueous dispersions of acrylonitrile interpolymers. A still further object is the application of the coating compositions containing the novel acrylonitrile interpolymers to metal and non-metallic substrates. A still further object is to provide cured coatings which are insoluble in organic solvents. A still further object is to provide coatings having desirable electrical insulating properties. These and other important objects will become readily apparent as the description of the invention proceeds.

These objects are accomplished by polymerizing a monomer mixture comprising (A) acrylonitrile, (B) an alpha-olefinic monocarboxylic acid selected from the group consisting of acrylic acid, methacrylic acid, ethacrylic acid, phenyl acrylic acid and crotonic acid, (C) an ester of said alpha-olefinic monocarboxylic acids with a saturated aliphatic monohydric alcohol of 1 to 8 carbon atoms and (D) a glycidol derivative selected from the group consisting of esters of said alpha-olefinic monocarboxylic acid with 2,3-epoxypropanol-1, and allyl glycidyl ether, the monomers being present in certain critical proportions, and subjecting the mixture of monomers to polymerizing conditions.

The invention is illustrated but is not limited to the following examples in which the parts and percentages are expressed on a weight basis.

Example 1

| | Parts by wt. |
|---|---|
| Polymerizable monomers: | |
| Acrylonitrile | 63.0 |
| Butyl acrylate | 32.0 |
| Methacrylic acid | 3.0 |
| Glycidyl methacrylate | 2.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Telogen: | |
| Dodecyl mercaptan | 0.5 |
| Water | 200.0 |

Example 2

| | Parts by wt. |
|---|---|
| Polymerizable monomers: | |
| Acrylonitrile | 63.0 |
| Butyl acrylate | 27.0 |
| Methacrylic acid | 5.0 |
| Glycidyl methacrylate | 5.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 3

| | Parts by wt. |
|---|---|
| Polymerizable monomers: | |
| Acrylonitrile | 63.0 |
| Butyl acrylate | 17.0 |
| Methacrylic acid | 10.0 |
| Glycidyl methacrylate | 10.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 4

| | Parts by wt. |
|---|---|
| Polymerizable monomers: | |
| Acrylonitrile | 50.0 |
| Butyl acrylate | 30.0 |
| Methacrylic acid | 10.0 |
| Glycidyl methacrylate | 10.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 5

| | Parts by wt. |
|---|---|
| Polymerizable monomers: | |
| Acrylonitrile | 40.0 |
| Butyl acrylate | 20.0 |
| Methacrylic acid | 15.0 |
| Glycidyl methacrylate | 25.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 6

| Polymerizable monomers: | Parts by wt. |
|---|---|
| Acrylonitrile | 47.5 |
| Methyl acrylate | 37.5 |
| Crotonic acid | 5.0 |
| Glycidyl crotonate | 10.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 7

| Polymerizable monomers: | Parts by wt. |
|---|---|
| Acrylonitrile | 57.5 |
| Ethyl acrylate | 37.5 |
| Crotonic acid | 2.0 |
| Glycidyl methacrylate | 3.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

Example 8

| Polymerizable monomers: | Parts by wt. |
|---|---|
| Acrylonitrile | 72.5 |
| Octyl acrylate | 20.0 |
| Acrylic acid | 2.5 |
| Allyl glycidyl ether | 5.0 |
| Polymerization initiator: | |
| Sodium bisulfite | 0.1 |
| Potassium persulfate | 0.3 |
| Dispersing agent: | |
| Sodium "Lorol" sulfate | 0.5 |
| Water | 200.0 |

In the Examples 1–8 the polymerization reactions are carried out under an atmosphere of an inert gas, such as, e. g. nitrogen, in a suitable polymerization vessel equipped with stirrer, reflux column, thermometer and inert gas inlet. Before the polymerizable monomers are charged into the reaction vessel the water is deoxygenated by refluxing for about 15 minutes under the atmosphere of nitrogen and then cooled to about 150° F. The dispersing agent is added to the deoxygenated water along with the sodium bisulfite, after which the mixture of polymerizable monomers is added followed by the addition of an aqueous solution of potassium persulfate. The aqueous polymerization charge is maintained at about 140° F. for about 2 hours or until the polymerization reaction is complete. Although the preferred polymerization temperature is about 140° F., the polymerization may be carried out at room temperature or as high as the refluxing temperature of the polymerization charge. After the polymerization reaction has run to completion the heated aqueous interpolymer dispersions are freed of residual monomers by blowing with air, which also removes some of the water thereby concentrating the dispersion.

In the specific formulae for the polymerization reaction sodium "Lorol" sulfate is the dispersing agent for the interpolymer. Other dispersing agents used in emulsion polymerization may be used in place thereof since the invention does not depend on any particular dispersing agent. The amount of dispersing agent may vary between 0.25% and 4%, based on the weight of polymerizable monomers, the preferred content is about .5%. All of the wetting agent may be added to the polymerization charge or part may be added to the aqueous dispersion of the interpolymer.

The redox (reduction/oxidation) polymerization initiator combination, in the specific examples is illustrated as being sodium bisulfite and potassium persulfate in the ratio of 1:3. This ratio may vary from 1:1 to 1:10. The amount of redox combination may vary as is well known by those skilled in the art. Other redox combinations can be used in place of the sulfite/persulfate combination. Other conventional polymerization initiators may be used, such as, e. g. inorganic peroxides, organic peroxides, salts of inorganic peroxides and azo nitrile catalysts.

The use of a telogen (polymer chain terminator) is illustrated in Example 1 to control the molecular weight of the interpolymer.

The interpolymer dispersions as produced generally have a pH in the range of about 3.5 to 5.5. Although these dispersions may be formulated into coating compositions under this acidic condition, better coalescing results and smoother films are obtained when the dispersions are applied at a pH value in the range of 7–10 and preferably at a pH of about 9.0 when using ammonium hydroxide to provide alkalinity. In place of ammonium hydroxide other alkaline materials which do not form strong electrolytes may be used to adjust the pH to an alkaline condition, such as, e. g., monoethanol amine, triethanol amine, and n-butyl amine.

The aqueous interpolymer dispersions were formulated into coating compositions in accordance with the following specific examples:

Example 9

A wire enamel was prepared with the interpolymer described in Example 2 in accordance with the following formula:

| | Parts by wt. |
|---|---|
| Aqueous dispersion of interpolymer from Example 2 (35.8% solids) | 89.4 |
| Tetramethylene sulfone | 9.6 |
| Aqueous ammonium hydroxide (28% NH$_3$) (to pH value of 9.1) | 1.0 |

The above wire enamel composition was applied to #25 copper magnet wire at a rate of about 10 feet per minute by passing it upwardly through a column of the aqueous coating composition. Pre-wetting the wire before each coat with a 1% aqueous solution of a wetting agent, such as, e. g. sodium "Lorol" sulfate, facilitated the deposition of the wire enamel composition. After each successive coat the coated wire was passed through an oven having an air temperature of about 550° F. and of such length that the exposure of the coated wire to the high heat was about 20 seconds.

The diameter of the dry coated wire was 2.4 mils greater than the uncoated wire, thus the dry film thickness was 1.2 mils.

The coated wire was tested for electrical and other properties and the following results were obtained:

| | |
|---|---|
| Cut-through temperature—° F. | 325. |
| Scrape abrasion resistance—strokes | 51. |
| Insulation resistance—wet—megohms | >20,000. |
| Quick snap/WOD | OK—no cracks. |
| Heat shock | OK—no cracks. |
| Dielectric breakdown — volts/mil of coating thickness | 3870. |
| Flexibility retention on aging at 275° F.—hours exposure before cracking is encountered | 650. |
| Solvent resistance in boiling mixture of equal volumes of ethyl alcohol and toluene | Insoluble. |

Cut-through temperature was determined by forming the coated wire into two separate U bends and placing one on top of the other at right angles to make contact at four points, placing the wire assembly between flat machined metal plate surfaces under a load of 1000 grams with the metal plates immersed in a Woods metal alloy bath for heat transfer, and increasing the temperature of the alloy bath until the wire cuts through the insulation to complete an electrical circuit by shorting.

Scrape abrasion or abrasion resistance of the enamel was measured by using a General Electric Scrape Abrasion Tester which involves dragging a 0.016 inch diameter needle under a load of 440 grams back and forth at a 90° angle in a horizontal plane over the enameled wire with the cylindrical surface of the needle in contact with the test surface.

Insulation resistance was measured with a General Electric Insulation Resistance Meter having a scale reading to 20,000 megohms. Two strands of the coated wire twisted together and soaked for 24 hours in distilled water prior to testing.

The test designated as "Quick Snap/WOD" was carried out by giving the wire a quick snap to elongate it to the breaking point, after which the wire was wound around its own circumference and examined for cracks.

Heat shock was determined by elongating the wire to the breaking point by a quick snap and then by winding the wire around its own circumference, heating it for one hour at 125° C. under this condition, after which the coating was examined for cracks.

The dielectric breakdown test was carried out by tightly twisting two coated wires together and measuring the voltage necessary to short through the insulation of the two twisted wires.

Fexibility retention on heat aging was determined by storing loose coils of coated wire in a 257° F. oven, removing samples from time to time, winding them around their own circumference and thereafter examining them for cracking.

Solvent resistance of the insulation was determined by immersing coated wire in a boiling mixture of equal volumes of toluene and ethyl alcohol for one hour.

*Example 10*

A wire enamel was prepared from the acrylonitrile interpolymer of Example 1 in accordance with the following formula:

| | Parts by wt. |
|---|---|
| Aqueous dispersion of interpolymers from Example 1 (35.5% solids) | 51.2 |
| Cyclic ethylene carbonate | 5.5 |
| Aqueous ammonium hydroxide (28% NH₃) (to pH value of 9.0) | .5 |
| Water | 42.8 |
| | 100.0 |

The above composition was applied to #25 copper magnet wire in the same manner as described in Example 9 and the coated wire had the following physical properties:

| | |
|---|---|
| Cut-through temperature—° F. | 439 |
| Scrape abrasion resistance—strokes | 99 |
| Dielectric breakdown—volts/mil of coating thickness | 3760 |
| Solvent resistance in boiling mixture of equal volumes of ethyl alcohol and toluene | Insoluble |

A control sample was prepared in which a #25 copper magnet wire was coated with a wire enamel differing from that described above in that an interpolymer was derived from a mixture of monomers comprising 63 parts of acrylonitrile, 32 parts of butyl acrylate and 5 parts of methacrylic acid. The control sample had a cut-through temperature of 295° F. thus showing the value of the glycidol derivative component in the interpolymer with respect to improving the cut-through temperature.

*Example 11*

A wire enamel formulated identical to that in Example 9 except the interpolymer was prepared with allyl glycidyl ether in place of glycidyl methacrylate, was coated on #25 magnet wire in the same manner as described in Example 9. The average cut-through temperature was 487° F., thus also indicating the effectiveness of allyl glycidyl ether as a cross-linking component of the interpolymer in improving the resistance to cut-through at high temperatures. The cured insulation of this example was as solvent resistant as that in Examples 9 and 10.

*Example 12*

A wire enamel was prepared with the interpolymer described in Example 2 in accordance with the following formula:

| | Parts by wt. |
|---|---|
| Aqueous dispersion of interpolymer from example 2 (35.8% solids) | 77.3 |
| Aqueous dispersion of heat reactive phenol formaldehyde resin (33% solids) | 4.5 |
| Tetramethylene sulfone | 8.3 |
| Aqueous ammonium hydroxide (28%NH₃) (to pH value of 9.5) | 1.6 |
| Water | 8.3 |

The water dilutable phenol/formaldehyde resin is commercially available as "Bakelite" BR-15100 at 66% solids in an aqueous medium.

A #25 magnet wire was coated with the above enamel composition in the same manner as described in Example 9. The diameter of the coated wire was 2.1 mils greater than the uncoated wire. The cut-through temperature was 400° F. The cured coating was insoluble in the boiling mixture of equal volumes of toluene and ethyl alcohol.

The cured wire enamels of Examples 9–12 are also insoluble in ethyl alcohol, toluene, aliphatic petroleum hydrocarbons, methyl ethyl ketone, ethyl acetate, trichloroethylene, and cyclohexanol.

The aqueous dispersion of the interpolymers described in Examples 1–8 may be used in formulating coating compositions for numerous other uses such as, e. g., clear and pigmented finishes for metallic and non-metallic substrates, primers and top coat finishes for refrigerators, washing machines, kitchen cabinets, etc. They may also be used in coating flexible substrates such as, rubber, leather, paper, textile fabrics, including those made from cotton, rayon, nylon, glass, polyacrylonitrile and polyethylene terephthalate.

The coating compositions of this invention may be modified by the addition of pigments, fillers, dyes, plasticizers, and other resinous film formers compatible with the interpolymers of this invention. Water-dilutable, heat-reactive synthetic resins are particularly useful for blending with the aqueous interpolymer dispersions of this invention such as, e. g., phenol/formaldehyde, as illustrated in Example 12, urea/formaldehyde, urea-melamine/formaldehyde, and helamine/formaldehyde resins. In Example 12 the heat-reactive phenol/formaldehyde resin is present in an amount corresponding to 5% based on the weight of the non-volatile content. Where it is desirable to further harden the coating composition the heat-reactive modifying resin may be present in amount as high as 25% based on the weight of the non-volatile content.

The coating compositions of Examples 9–12 call for a solvent for the interpolymer which acts as a coalescing agent upon drying the composition. The presence of coalescing agents cause the aqueous dispersions to be less critical to application conditions. However, presence of a coalescing agent is not essential to satisfactory application of the coating compositions when sufficient heat is employed to bring about coalescence. The coating compositions containing the interpolymers of this invention in which the acrylonitrile is the predominating component generally do not satisfactorily coalesce on air drying at moderate temperature; hence it is desirable to employ an agent to facilitate coalescence of such interpolymers. For applications where drying is carried out at room temperature or under moderate heat (200–250° F.) the coalescing agent may be present in an amount up to 150% by weight of the interpolymer. In the examples the coalescing agents are shown to be tetramethylene sulfone and cyclic ethylene carbonate. Other examples of water soluble coalescing agents which may be employed include dimethyl formamide, dimethyl acetamide, alkyl monoethers of ethylene glycol or diethylene glycol and diacetone alcohol.

The novelty of the four component interpolymers of this invention resides in the cross-linking activity through the carboxyl groups of the polymerizable acidic component and through the epoxide group of the polymerizable glycidol derivative.

The examples illustrate the use of methacrylic, acrylic and crotonic acids. In place of these alpha-olefinic monocarboxylic acids it is also within the scope of this invention to use ethacrylic acid and phenyl acrylic acid in like amounts in the examples. However, methacrylic acid is particularly preferred because of its polymerization rate.

In addition to the alkyl acrylates shown in the examples it is to be understood that other esters of the aforementioned alpha-olefinic monocarboxylic acids with saturated aliphatic monohydric alcohols of 1 to 8 carbon atoms may be used, such as, e. g. the methyl, ethyl, propyl, isopropyl, butyl, isobutyl, amyl, hexyl, 2-ethyl butyl, cyclohexyl, heptyl, and octyl alcohols.

The glycidol (2,3-epoxypropanol-1) derivatives illustrated in the examples are glycidyl methacrylate, allyl glycidyl ether and glycidyl crotonate. In place thereof other glycidyl esters of the aforementioned alpha-olefinic monocarboxylic acids with 2,3-epoxypropanol-1 may be used in practicing this invention. Glycidyl methacrylate and allyl glycidyl ether are the preferred glycidol derivatives.

The interpolymers of this invention are derived from mixtures of monomeric polymerizable components varying within the following operative ranges:

| | Parts by wt. |
|---|---|
| Acrylonitrile | 40 to 75 |
| Alpha-olefinic monocarboxylic acid | 2 to 15 |
| Alkyl acrylate | 15 to 37.5 |
| Polymerizable glycidol derivative | 1 to 25 | for a total of 100 parts of the mixture.

The preferred ranges are:

| | Parts by wt. |
|---|---|
| Acrylonitrile | 50 to 65 |
| Alpha-olefinic monocarboxylic acid | 2 to 10 |
| Alkyl acrylate | 15 to 35 |
| Polymerizable glycidol derivative | 1 to 10 | for a total of 100 parts of the mixture.

In the preferred embodiment of this invention the interpolymers are prepared by emulsion polymerization in an aqueous medium and the coating compositions are prepared directly therefrom without isolating the resin. However the interploymer may be separated from the aqueous medium and dissolved in organic solvents for the interpolymer in the preparation of coating compositions. It is also possible to polymerize the monomer mixture in an organic liquid which is a solvent for the interpolymer. However, the interpolymers of this invention, of a molecular weight sufficiently high for most uses, are insufficiently soluble in conventional solvents to provide practical solution type coating compositions. For this reason the polymerization is preferably carried out in an aqueous medium to provide practical aqueous dispersions.

The cross-linked interpolymers of this invention provide coatings which are highly resistant to organic solvents used in conventional coating compositions, which makes them particularly useful in applications where contact with such solvents and solvent vapors are encountered.

Compositions of this invention provide significant economy through the use of an aqueous volatile vehicle. The use of innocuous solvents is eliminated. The cross-linked acrylic interpolymer dispersions are economically prepared from readily available components.

Many modifications and different embodiments of this invention may be made without departing from the spirit and scope thereof and it is to be understood that the invention is not limited to the specific embodiments disclosed except as defined in the appended claims.

I claim:

1. A cross-linkable interpolymer of monomers consisting of (A) 40 to 75 parts of acrylonitrile, (B) 2 to 15 parts of an alpha-olefinic monocarboxylic acid selected from the group consisting of acrylic acid, methacrylic acid, ethacrylic acid, phenyl acrylic acid and crotonic acid, (C) 15 to 37.5 parts of an ester of said alpha-olefinic monocarboxylic acids with a saturated aliphatic monohydric alcohol of 1 to 8 carbon atoms and (D) 1 to 25 parts of a glycidol derivative selected from the group consisting of esters of said alpha-olefinic monocarboxylic acid with 2,3-epoxypropanol-1, and allyl glycidyl ether, for a total of 100 parts by weight.

2. A cross-linkable interpolymer of monomers consisting of (A) 50 to 65 parts of acrylonitrile, (B) 2 to 10 parts of an alpha-olefinic monocarboxylic acid selected from the group consisting of acrylic acid, methacrylic acid, ethacrylic acid, phenyl acrylic acid and crotonic acid, (C) 15 to 35 parts of an ester of said alpha-olefinic monocarboxylic acids with a saturated aliphatic monohydric alcohol of 1 to 8 carbon atoms and (D) 1 to 10 parts of a glycidol derivative selected from the group consisting of esters of said alpha-olefinic monocarboxylic acid with 2,3-epoxypropanol-1, and allyl glycidyl ether, for a total of 100 parts by weight.

3. The composition of claim 1 in which the component B is methacrylic acid.

4. The composition of claim 1 in which the component C is butyl acrylate.

5. The composition of claim 1 in which the component D is glycidyl methacrylate.

6. The composition of claim 1 in which the component D is allyl glycidyl ether.

7. A cross-linkable quaternary interpolymer of monomers consisting of (A) 40 to 75 parts of acrylonitrile, (B) 2 to 15 parts of methacrylic acid, (C) 15 to 37.5 parts of butyl acrylate and (D) 1 to 25 parts of glycidyl methacrylate for a total of 100 parts by weight.

8. A coating composition comprising an aqueous dispersion of the interpolymer of claim 1 and a water-dilutable, heat convertible resin selected from the class consisting of phenol/formaldehyde resin, urea/formaldehyde resin, urea-melamine/formaldehyde resin and melamine/formaldehyde resin.

9. A wire having an electrical insulating coalesced coating comprising the product of claim 1.

10. The process of preparing cross-linkable acrylic interpolymers which comprises subjecting to polymerizing conditions a mixture of polymerizable monomers in an aqueous medium, said monomers consisting of (A) 40 to 75 parts acrylonitrile, (B) 2 to 15 parts of an alpha-olefinic monocarboxylic acid selected from the group consisting of acrylic acid, methacrylic acid, ethacrylic acid, phenyl acrylic acid and crotonic acid, (C) 15 to 37.5 parts of an ester of said alpha-olefinic monocarboxylic acids with a saturated aliphatic monohydric alcohol of 1 to 8 carbon atoms and (D) 1 to 25 parts of glycidol derivative selected from the group consisting of esters of said alpha-olefinic monocarboxylic acid with 2,3-epoxy-propanol-1 and allyl glycidyl ether for a total of 100 parts by weight.

11. An aqueous dispersion of the interpolymer of claim 1.

References Cited in the file of this patent

UNITED STATES PATENTS

| | | |
|---|---|---|
| 2,191,581 | Nowak et al. | Feb. 27, 1940 |
| 2,557,266 | Dittmar et al. | June 19, 1951 |
| 2,562,897 | Ellingboe | Aug. 7, 1951 |
| 2,604,463 | Bilton et al. | July 22, 1952 |
| 2,650,151 | Ham | Aug. 25, 1953 |